(12) United States Patent
Hachiya et al.

(10) Patent No.: US 8,619,437 B2
(45) Date of Patent: Dec. 31, 2013

(54) SWITCHING POWER SUPPLY DEVICE HAVING A CONTROLLER TO CALCULATE THE DUTY RATE AND OUTPUT CURRENT

(75) Inventors: Koji Hachiya, Kasugai (JP); Yusaku Ido, Kani (JP); Yasumichi Omoto, Kasugai (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 262 days.

(21) Appl. No.: 13/275,641

(22) Filed: Oct. 18, 2011

(65) Prior Publication Data

US 2012/0092896 A1    Apr. 19, 2012

(30) Foreign Application Priority Data

Oct. 19, 2010 (JP) .................. 2010-234274

(51) Int. Cl.
*H02M 3/335* (2006.01)
*H02M 3/24* (2006.01)

(52) U.S. Cl.
USPC ...... 363/20; 363/21.01; 363/21.04; 363/21.1; 363/21.17; 363/21.18; 363/95; 363/97

(58) Field of Classification Search
USPC ............. 363/20, 21.01, 21.04, 21.1, 21.17, 363/21.18, 95, 97
See application file for complete search history.

(56) References Cited

U.S. PATENT DOCUMENTS

| 7,994,768 | B2* | 8/2011 | Park | 323/283 |
|---|---|---|---|---|
| 8,300,431 | B2* | 10/2012 | Ng et al. | 363/21.12 |
| 8,330,299 | B2* | 12/2012 | Steigerwald et al. | 307/140 |
| 8,335,090 | B2* | 12/2012 | Huang et al. | 363/17 |
| 2002/0131224 | A1 | 9/2002 | Yoshida et al. | |
| 2007/0290668 | A1* | 12/2007 | Chou et al. | 323/299 |
| 2009/0079402 | A1* | 3/2009 | Nakahori | 323/255 |
| 2011/0216559 | A1* | 9/2011 | Ng et al. | 363/21.13 |

FOREIGN PATENT DOCUMENTS

| JP | 06-217533 A | 8/1994 |
|---|---|---|
| JP | 07-059344 A | 3/1995 |
| JP | 2002-305873 A | 10/2002 |
| JP | 2003-274648 A | 9/2003 |
| JP | 2008-182839 A | 8/2008 |
| JP | 2008-236999 A | 10/2008 |
| JP | 2009-148107 A | 7/2009 |

OTHER PUBLICATIONS espacenet, Patent Abstract for Japanese Publication No. 2003274648, Published Sep. 26, 2003 (1 page).

(Continued)

*Primary Examiner* — Bao Q Vu
(74) *Attorney, Agent, or Firm* — Osha Liang LLP

(57) ABSTRACT

A system simplification can be achieved by reducing the number of sensors required to detect currents and voltages when an output current is estimated. A switching power supply device 6 includes a current transformer 12, a switching circuit 13, a rectifying circuit 15, a smoothing circuit 16, an input voltage detecting circuit 18, a control part 19, an output voltage detecting circuit 22 and a PWM signal generating part 30. The control part 19 calculates a duty rate and an average value of voltage of the secondary side voltage of the current transformer 12 detected by the input voltage detecting circuit 18 based on a waveform of the detected voltage. The control part 19 calculates an output current Io based on the calculated duty rate, the calculated average value of voltage and an output voltage Vo detected by the output voltage detecting circuit 22.

4 Claims, 4 Drawing Sheets

(56) References Cited

OTHER PUBLICATIONS

Patent Abstract for Japanese Publication No. 2008236999, Published Oct. 2, 2008 (1 page).

Notification of Reasons for Refusal issued in Japanese Application No. 2010-234274, dated Feb. 19, 2013, and translation thereof (7 pages).

* cited by examiner

SWITCHING POWER SUPPLY DEVICE HAVING A CONTROLLER TO CALCULATE THE DUTY RATE AND OUTPUT CURRENT

BACKGROUND OF THE INVENTION

1. Technical Field

The present invention relates to a switching power supply device which converts an input voltage to a pulsed voltage by a switching operation and rectifies this pulsed voltage to output a direct-current (DC) voltage.

2. Related Art

For example, an electric car or a hybrid car is equipped with a high-voltage battery and a power supply device. The high-voltage battery is used for operating a driving motor. The power supply device lowers a voltage from the battery to supply to various in-car electric components. Generally, a switching power supply device (DC-DC convertor) is used as the power supply device. The switching power supply device includes a switching circuit, a rectifying circuit and a smoothing circuit. The switching circuit converts a DC voltage to a pulsed voltage by a switching operation according to a pulse width modulation (PWM) signal. The rectifying circuit rectifies the pulsed voltage. The smoothing circuit smooths the voltage rectified by the rectifying circuit. This switching power supply device is disclosed in Japanese Unexamined Patent Publication Nos. 2008-236999, 2003-274648, and 2002-305873 which will be described later.

The switching power supply device requires a lot of sensors detecting an input voltage, an input current, an output voltage and an output current, etc., in order to constantly monitor states of circuits. In order to detect an input voltage, a resistor having a large allowable power value is required for dividing the input voltage, and hence a large space for circuit implementation is needed. A current sensor or a shunt resistor, etc., may be used as means for detecting an input current or an output current. However, there are drawbacks that the current sensor has a complex configuration, and the shunt resistor has a large power loss. In contrast, if a current transformer is used as the current detecting section, there is an advantage that a circuit configuration can be simplified. The current transformer is used in the switching power supply device as disclosed in Japanese Unexamined Patent Publication Nos. 2008-236999, 2003-274648, and 2002-305873.

In the switching power supply device disclosed in Japanese Unexamined Patent Publication No. 2008-236999, a current detecting part includes a current transformer and a sample and hold part holding a peak value of a signal obtained by the current transformer to output it as a detection signal. A control part provides a driving signal having a predetermined pulse width to a switching device, based on the detection signal from the current detecting part and an output voltage. The control part estimates an average value with respect to primary current ripple based on the output voltage and the driving signal applied to the switching device, and calculates a value of an output current through a load based on the average value.

In the switching power supply device disclosed in Japanese Unexamined Patent Publication No. 2003-274648, a current detecting part includes a current transformer detecting a current of a switching section as a voltage, and a voltage converting circuit converting a duty rate of a driving pulse for the switching section to a voltage. The current detecting part adds the converted voltage by the voltage converting circuit to the detected voltage by the current transformer, and outputs it to a PWM control part as a corrected detection voltage.

The switching power supply device disclosed in Japanese Unexamined Patent Publication No. 2002-305873 includes an overcurrent protective section which detects a peak current of current through a switching section by a current transformer to limit an output current. In the overcurrent protective section, the detected peak current value is corrected by using an input voltage, an output voltage and a voltage proportional to a duty rate of the switching section.

Regarding the switching power supply device, one microcomputer may include a PWM signal generating part for generating a PWM signal and a control part for controlling an output voltage. In this case, since a PWM process and a control process have to be concurrently performed in the same microcomputer, there is a problem that the PWM process slows down due to the control process.

If the PWM signal generating part for generating the PWM signal and the control part for controlling the output voltage are included in different microcomputers, respectively, the PWM process and the control process are individually performed, and hence the PWM process can be accelerated. For example, if a process cycle of the microcomputer for the control is set to 1 millisecond and a process cycle of the microcomputer for the PWM is set to 10 microseconds, the process cycle of the microcomputer for the PWM can be shortened, and hence an operating frequency of the switching circuit can be increased. Accordingly, since the switching circuit rapidly operates when a failure is detected, a response can be improved. In addition, a transformer connected between the switching circuit and the rectifying circuit can be downsized.

SUMMARY

The present invention provides a switching power supply device using a current transformer as a current detecting section, in which the switching power supply device estimates an output current in a different way than Japanese Unexamined Patent Publication Nos. 2008-236999, 2003-274648, and 2002-305873. A main object of the present invention is to achieve a system simplification by reducing the number of sensors required to detect currents and voltages.

In accordance with one aspect of the present invention, a switching power supply device includes: a switching circuit configured to convert a DC voltage to a pulsed voltage by a switching operation according to a PWM signal; a rectifying circuit configured to rectify the pulsed voltage; a smoothing circuit configured to smooth a voltage rectified by the rectifying circuit; a first voltage detecting circuit configured to detect an output voltage from the smoothing circuit; a PWM signal generating part configured to generate a PWM signal according to the voltage detected by the first voltage detecting circuit, and output the PWM signal to the switching circuit; a current transformer arranged on a front stage of the switching circuit; a second voltage detecting circuit configured to detect a voltage of a secondary side of the current transformer; and a control part configured to calculate an output current from the smoothing circuit. The control part may be configured to calculate a duty rate of the voltage detected by the second voltage detecting circuit based on a waveform of the detected voltage, and calculate the output current based on the calculated duty rate, the voltage detected by the first voltage detecting circuit and the voltage detected by the second voltage detecting circuit.

According to this aspect, the output current can be easily estimated by detecting the voltage of the secondary side of the current transformer and executing the predetermined calculation on the control part. Therefore, since the number of sensors is reduced and a system is simplified, a reduction in size and weight and a cost reduction can be achieved. In addition, because there is no wasted power, power losses can be reduced. Furthermore, since the output current is calculated with reference to the input voltage, the output current value can be accurately calculated in response to a change in the input voltage.

In the aspect of the invention, the control part may be configured to: calculate an input voltage applied to the switching circuit based on the duty rate and the voltage detected by the first voltage detecting circuit; calculate an average or a peak value of the voltage detected by the second voltage detecting circuit based on the detected voltage; and calculate the output current based on the calculated input voltage and the calculated average or peak value.

The control part may be configured to: calculate the average or peak value of the voltage detected by the second voltage detecting circuit based on the detected voltage; and calculate an input current through a primary side of the current transformer based on the calculated average or peak value.

The control part may be configured to determine whether or not circuit failures occur, based on the current value of the output current.

According to the switching power supply device of the aspect of the invention, a simplified circuit configuration for calculating the output current is achieved.

DETAILED DESCRIPTION

Hereinafter, preferred embodiments of the present invention will be described with reference to the drawings. Here, an example that a switching power supply device according to the present invention is applied to an electric car (or a hybrid car) is described.

Figure 1:
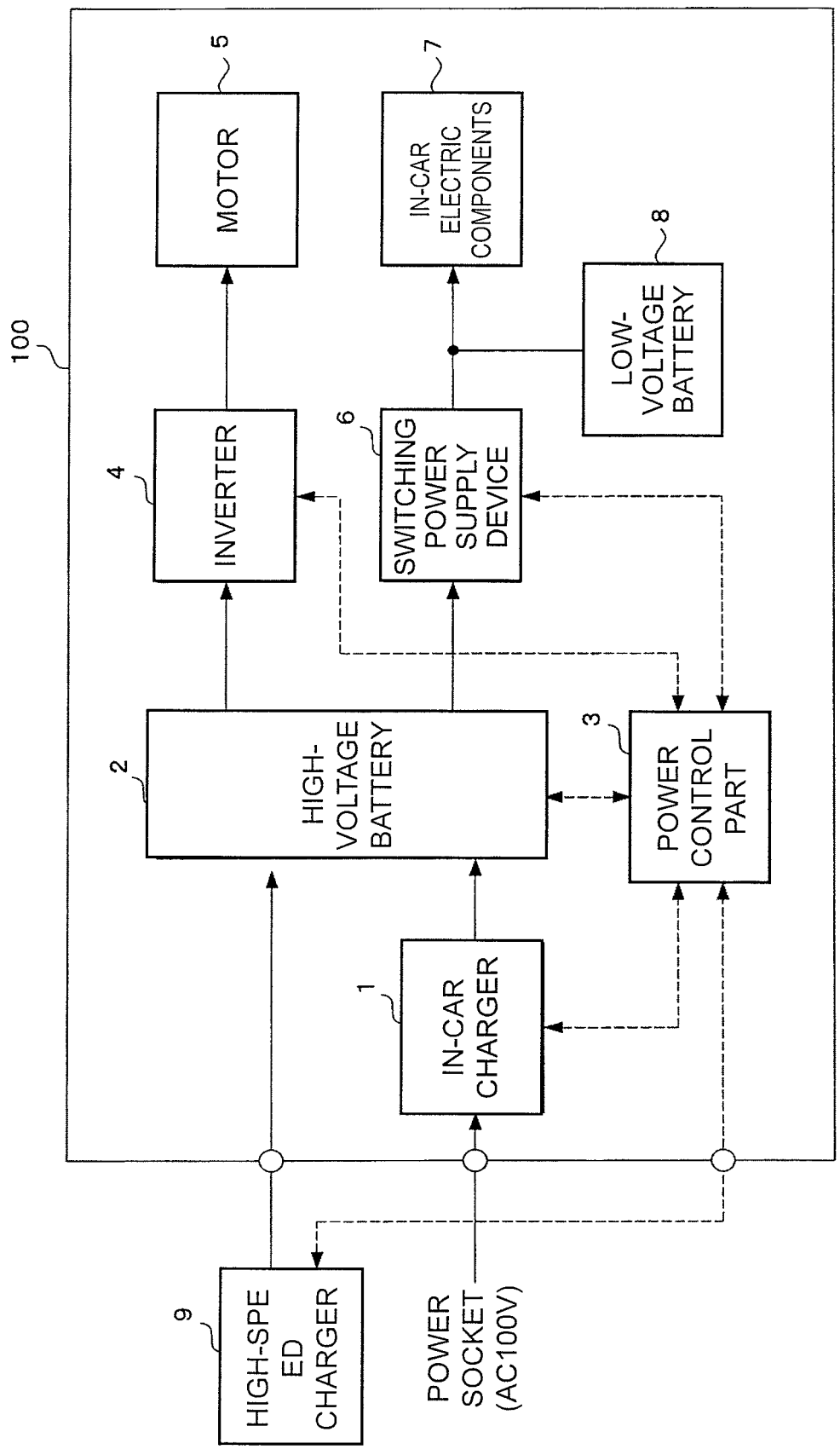
FIG. 1 is a block diagram illustrating an electric configuration of an electric car.

As shown in FIG. 1, an electric car (or hybrid car) 100 includes an in-car charger 1, a high-voltage battery 2, a power control part 3, an inverter 4, a motor 5, a switching power supply device 6, in-car electric components 7 and a low-voltage battery 8. In FIG. 1, each solid arrow indicates a flow of power, and each dashed arrow indicates a flow of signal.

The in-car charger 1 performs a charging operation by using a domestic power socket (AC 100 V). The high-voltage battery 2 is charged by the in-car charger 1 or an external high-speed charger 9. The high-voltage battery 2 supplies power to the inverter 4 and the switching power supply device 6. The inverter 4 generates a motor driving voltage to provide it to the motor 5. The switching power supply device 6 generates a DC voltage for charging the low-voltage battery 8. The switching power supply device 6 is described in detail below. The low-voltage battery 8 supplies a DC voltage to the various in-car electric components 7. The power control part 3 controls the power system including the high-voltage battery 2, the inverter 4 and the switching power supply device 6, etc., via a control area network (CAN) bus. In addition, the power control part 3 communicates with the in-car charger 1 and the high-speed charger 9 via the CAN bus to transmit charging information, etc.

Figure 2:
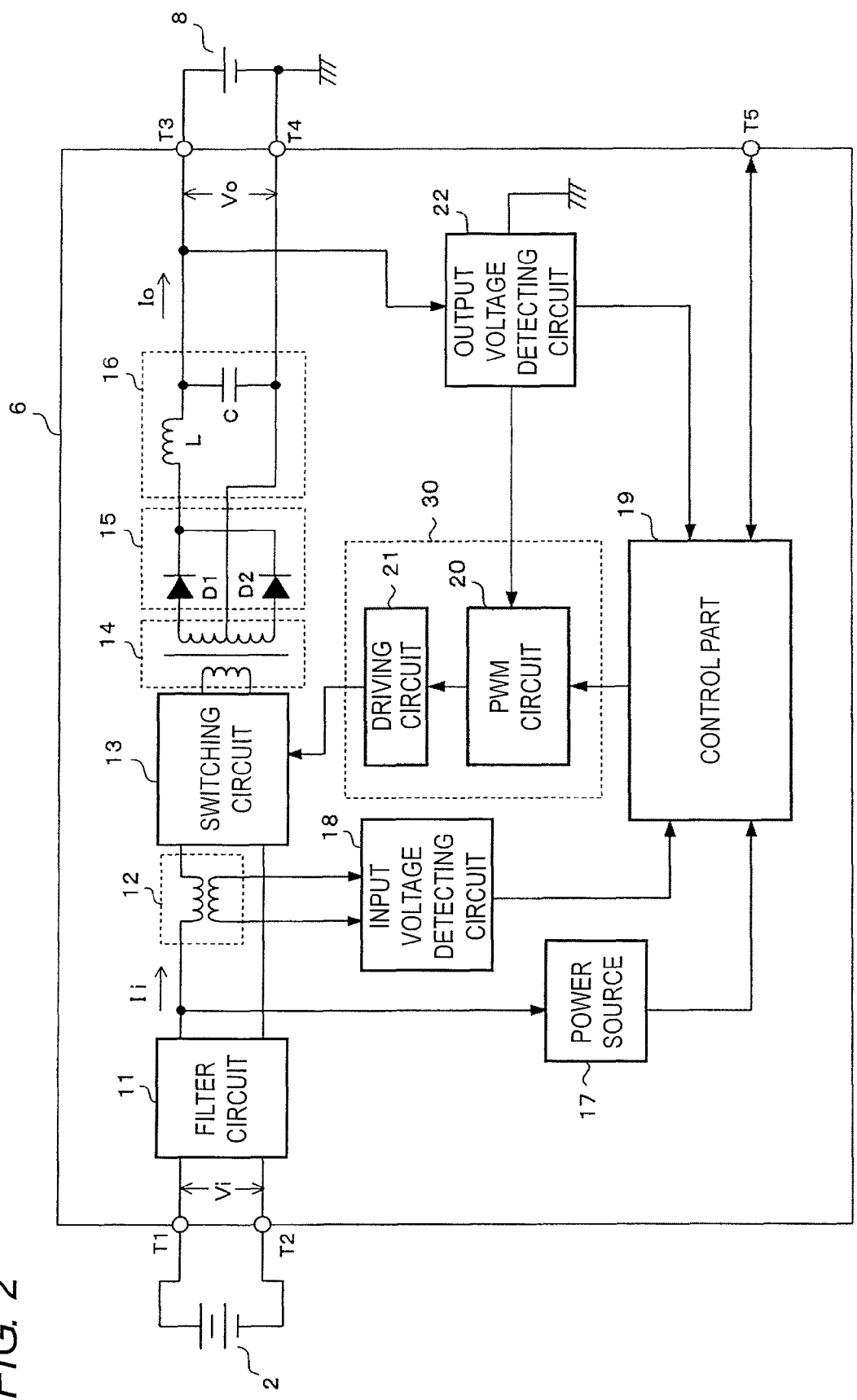
FIG. 2 is a circuit diagram illustrating a switching power supply device according to an embodiment of the present invention.

Hereinafter, the details of the switching power supply device 6 will be described with reference to FIG. 2. In FIG. 2, the same elements as those in FIG. 1 are denoted by the same reference numerals. The switching power supply device 6 shown in FIG. 2 is a DC-DC convertor which converts a high-voltage direct current to an alternating current by switching, and then converts the alternating current to a low-voltage direct current.

Input terminals T1, T2 of the switching power supply device 6 are connected to the high-voltage battery 2. A voltage from the high-voltage battery 2 is in the range of DC 220 V to DC 400 V, for example. Noises of the voltage (input voltage Vi) from the high-voltage battery 2 applied to the input terminals T1, T2 are eliminated by a filter circuit 11. The filter circuit 11 is connected to an input side of a switching circuit 13 through a primary side coil of a current transformer 12. A secondary side coil of the current transformer 12 is connected to an input voltage detecting circuit 18. The input voltage detecting circuit 18 corresponds to the second voltage detecting circuit according to the present invention, and detects a secondary side voltage of the current transformer 12.

The switching circuit 13 is a well-known circuit having, for example, field effect transistors (FETs) as semiconductor switching elements. The FETs of the switching circuit 13 are switched on and off in response to a pulse width modulation (PWM) signal provided from a driving circuit 21.

A primary side coil of a main transformer 14 is connected to an output side of the switching circuit 13. A secondary side coil of the main transformer 14 is connected to an input side of a rectifying circuit 15 including diodes D1, D2. A smoothing circuit 16 including a coil L and a capacitor C is connected to an output side of the rectifying circuit 15. Output side of the smoothing circuit 16 is connected to output terminals T3, T4. The low-voltage battery 8 is connected to the output terminals T3, T4. For example, the low-voltage battery 8 is charged to DC 12 V according to an output voltage from the output terminals T3, T4.

An output voltage detecting circuit 22 is provided to the output side of the smoothing circuit 16. The output voltage detecting circuit 22 detects the voltage between the output terminals T3, T4, i.e., an output voltage Vo from the smoothing circuit 16. A voltage value of the detected output voltage Vo is applied to the PWM circuit 20 in order to perform a feedback control, and also applied to a control part 19.

The control part 19 includes a microcomputer (microcomputer for control). The detected voltage by the input voltage detecting circuit 18 and the detected voltage by the output voltage detecting circuit 22 are applied to the control part 19. The control part 19 performs the calculation based on these voltages, as mentioned below. The control part 19 also communicates with the power control part 3 (FIG. 1) through a terminal T5.

A power source 17 is connected to an output side of the filter circuit 11. The power source 17 lowers the voltage from the high-voltage battery 2 to supply a power supply voltage, for example DC 12 V, to the control part 19, etc.

The PWM circuit 20 compares the output voltage value fed back from the output voltage detecting circuit 22 with a reference voltage value. The PWM circuit 20 calculates a duty rate of a PWM signal based on a deviation between the values. The PWM circuit 20 outputs a signal (square wave voltage) in response to the duty rate to the driving circuit 21.

The driving circuit 21 generates a PWM signal having a predetermined duty rate based on the signal from the PWM circuit 20. The PWM signal is applied to gates of the FETs in the switching circuit 13 to turn on/off the FETs. A PWM signal generating part 30 includes the PWM circuit 20 and the driving circuit 21. The PWM signal generating part 30 includes a microcomputer (microcomputer for PWM) different from the control part 19. The control part 19 applies an operation start command signal and an operation stop command signal to the PWM circuit 20.

An operation of the switching power supply device 6 having the above-mentioned configuration will be described below. The DC voltage from the high-voltage battery 2 applied to the input terminals T1, T2 is transmitted to the switching circuit 13 via the current transformer 12, after noises thereof are eliminated by the filter circuit 11. In the switching circuit 13, a switching operation for the DC voltage is performed by turning on/off the FETs based on the PWM signal from the PWM signal generating part 30. Accordingly, the DC voltage is converted to a high-frequency pulsed voltage.

The pulsed voltage is transmitted to the rectifying circuit 15 via the main transformer 14. The rectifying circuit 15 rectifies the pulsed voltage by the diodes D1, D2. The rectified voltage by the rectifying circuit 15 is input into the smoothing circuit 16. The smoothing circuit 16 smooths the rectified voltage by a filtering action of the coil L and the capacitor C to output a low DC voltage to the output terminals T3, T4. The low-voltage battery 8 connected to the output terminals T3, T4 is charged according to the DC voltage.

The output voltage from the smoothing circuit 16 is input into the output voltage detecting circuit 22. The output voltage detecting circuit 22 outputs a voltage value of the detected output voltage to the PWM circuit 20 and the control part 19. The PWM circuit 20, as described above, calculates a duty rate of a PWM signal based on a deviation between the output voltage value and the reference voltage value. The driving circuit 21 generates a PWM signal in response to the duty rate to output it to the gates of the FETs in the switching circuit 13. Accordingly, a feedback control for keeping the output voltage constant is performed.

A secondary side voltage of the current transformer 12 is applied to the input voltage detecting circuit 18. The secondary side voltage is a voltage obtained by converting a current value of a current flowing from the terminal T1 to the primary side of the current transformer 12, i.e., an input current Ii to a voltage value. The voltage detected by the input voltage detecting circuit 18 is applied to the control part 19.

The control part 19 calculates an output current Io from the smoothing circuit 16 based on the voltage from the input voltage detecting circuit 18 and the voltage from the output voltage detecting circuit 22. The control part 19 determines whether or not circuit failures occur, based on a current value of the output current Io. In this case, when the current value of the output current Io indicates an abnormal value, the control part 19 determines occurrence of a failure and notifies the power control part 3 (FIG. 1) of the occurrence of the failure via the terminal T5. When the power control part 3 receives the notification, the power control part 3 performs processing such as shutdown of power supply to the respective parts. Regarding the circuit failures, failures of the switching power supply device 6 and a load may occur.

Figure 3:
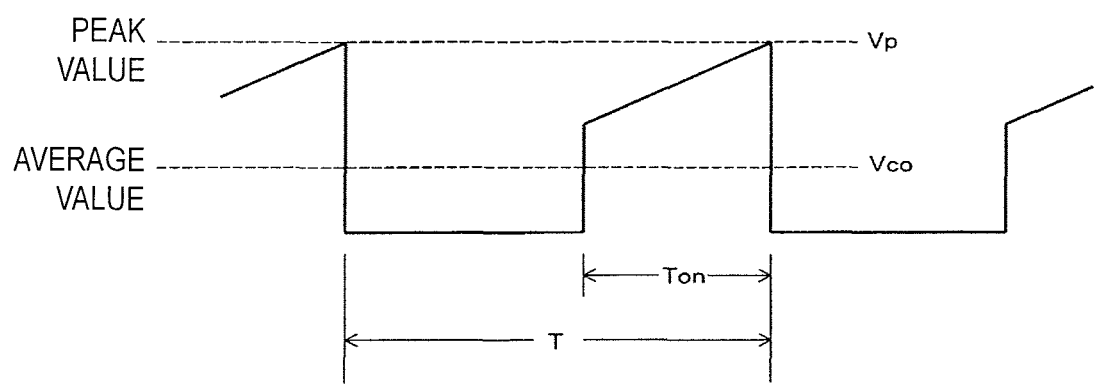
FIG. 3 illustrates a voltage waveform of a secondary side of a current transformer.

The calculation performed by the control part 19 will be described in detail below. FIG. 3 shows a voltage waveform of the secondary side of the current transformer 12. The duty rate D of the voltage and the voltage average value Vco can be calculated based on the voltage waveform. The duty rate D can be calculated according to the following equation (1), based on a high revel (ON) interval Ton and a cycle T of the signal in FIG. 3.

$$D = Ton/T \quad (1)$$

The voltage average value Vco can be calculated by averaging the secondary side voltage of the current transformer 12 by using a filter (not shown) or an operation of the microcomputer.

Because the secondary side voltage of the current transformer 12 is generated according to a switching operation of the switching circuit 13, the duty rate D of the voltage corresponds to the duty rate of the PWM signal in the switching circuit 13 (Ton of FIG. 3 is an interval of turning on the FETs of the switching circuit 13). Therefore, a relationship between the duty rate D of the secondary side voltage of the current transformer 12, the input voltage Vi between the input terminals T1, T2 and the output voltage Vo between the output terminals T3, T4 is expressed as the following equation (2).

$$Vo = Vi \cdot (N2/N1) \cdot D \quad (2)$$

Where N1 is the number of turns of the primary side coil of the main transformer 14, and N2 is the number of turns of the secondary side coil of the main transformer 14.

According to the above equation (2), it is understood that the input voltage Vi can be estimated based on the duty rate D if the output voltage Vo is identified. The input voltage Vi can be calculated by the following equation (3).

$$Vi = Vo \cdot (N1/N2)/D \quad (3)$$

The duty rate D and the voltage average value Vco of the voltage waveform in FIG. 3 vary in response to a variation in the input current Ii. As described above, since the secondary side voltage of the current transformer 12 corresponds to the input current through the primary side of the current transformer 12, the input current can be calculated based on the voltage average value Vco.

Figure 4:
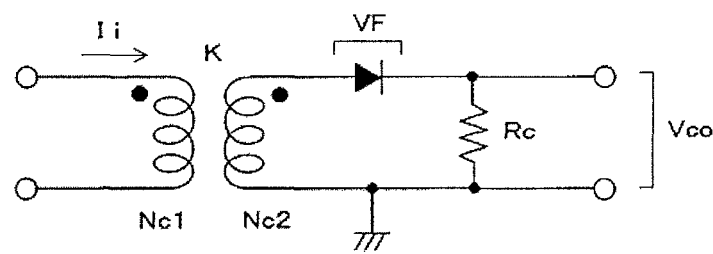
FIG. 4 illustrates a basic configuration of the current transformer.

In a basic configuration of a current transformer shown in FIG. 4, when it is assumed that: Ii is an input current; Nc1 is the number of turns of a primary side coil of the current transformer; Nc2 is the number of turns of a secondary side coil of the current transformer; VF is a forward drop voltage of a diode; Rc is a resistance value of an output level determining resistor; and K is a coupling degree of the current transformer, the voltage average value Vco of the current transformer 12 is expressed as the following equation (4).

$$Vco = K \cdot Ii \cdot Rc \cdot (Nc1/Nc2) + VF \quad (4)$$

According to the equation (4), the input current Ii is expressed as the following equation (5).

$$Ii = (Vco - VF) \cdot Nc2/(K \cdot Rc \cdot Nc1) \quad (5)$$

The output current Io is expressed as the following equation (6) with the input current Ii, the input voltage Vi, the output voltage Vo and a conversion efficiency η.

$$Io = Ii \cdot Vi \cdot \eta / Vo \quad (6)$$

When the equation (5) is substituted in the equation (6), the output current Io is expressed as the following equation (7).

$$Io = \eta \cdot (Vco - VF) \cdot Vi \cdot Nc2/(K \cdot Vo \cdot Rc \cdot Nc1) \quad (7)$$

According to the equation (7), it is understood that the output current Io can be calculated based on the voltage average value Vco of the current transformer 12, the input voltage Vi and the output voltage Vo. The voltage average value Vco can be obtained from a detection result of the input voltage detecting circuit 18. The input voltage Vi can be obtained from the duty rate D and the output voltage Vo, as expressed in the equation (3). The output voltage Vo can be obtained from a detection result of the output voltage detecting circuit 22. Accordingly, a value of the output current Io can be estimated by calculating the duty rate D and the voltage average value Vco based on the output waveform (FIG. 3) of the current transformer 12. In addition, a value of the input current Ii can be estimated with the equation (5) based on the voltage average value Vco.

As mentioned above, according to the present embodiment, the output current Io can be easily estimated by detecting the secondary side voltage of the current transformer 12 to perform a predetermined calculation in the control part 19. Therefore, since the number of sensors is reduced and a system is simplified, a reduction in size and weight and a cost reduction can be achieved. In addition, because there is no wasted power, power losses can be reduced. Furthermore, it can be understood from the equation (7) that since the output current Io is calculated in consideration of the input voltage Vi, the accurate output current value can be calculated in response to a variation in the input voltage Vi.

Figure 5:
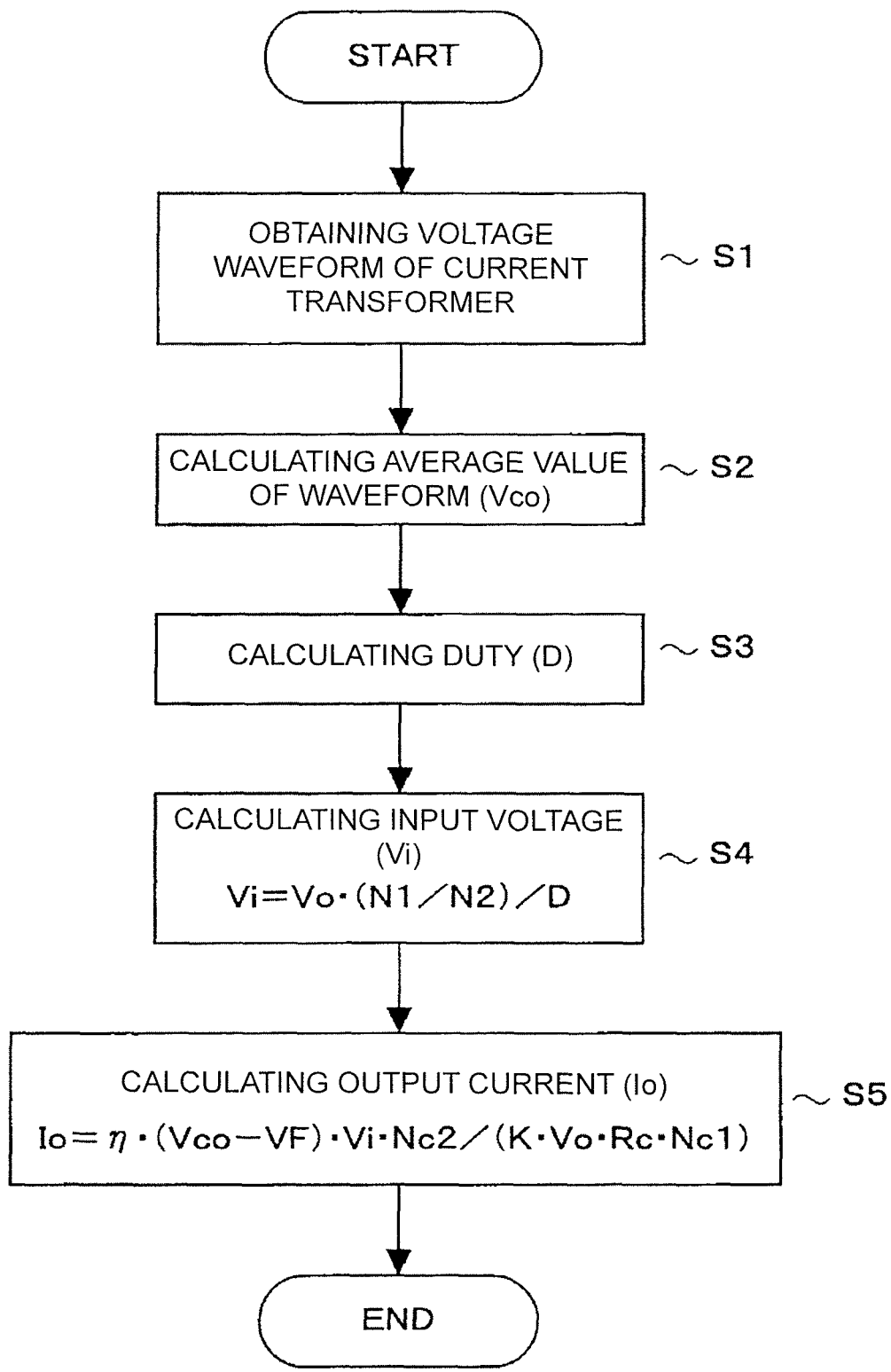
FIG. 5 is a flowchart illustrating a procedure for calculating an output current.

FIG. 5 is a flowchart showing the procedure for calculating the output current as mentioned above. Processes of the steps are performed by the microcomputer included in the control part 19.

In the step S1, a voltage waveform (FIG. 3) of the secondary side of the current transformer 12 is obtained based on a detection result of the input voltage detecting circuit 18.

In the step S2, a voltage average value Vco is calculated based on the voltage waveform obtained in the step S1.

In the step S3, a duty rate D is calculated according to the equation (1), based on the voltage waveform obtained in the step S1.

In the step S4, an input voltage Vi is calculated according to the above equation (3) with the duty rate D calculated in the step S3 and an output voltage Vo detected by the output voltage detecting circuit 22.

In the step S5, an output current Io is calculated according to the above equation (7) with the voltage average value Vco of the current transformer 12 calculated in the step S2, the input voltage Vi calculated in the step S4 and the output voltage Vo detected by the output voltage detecting circuit 22.

Various embodiments may be applied to the present invention, other than the above-mentioned embodiment. For example, in the above-mentioned embodiment, the output current Io is calculated based on the voltage average value Vco. However, the output current Io may be calculated based on a voltage peak value Vp shown in FIG. 3 as substitute for the voltage average value Vco.

In the embodiment, the presence or absence of a circuit failure is determined based on the output current Io. In addition, the presence of absence of a circuit failure may be also determined based on the input current Ii. Moreover, the presence or absence of a circuit failure may also determined based on the output voltage Vo detected by the output voltage detecting circuit 22.

In the embodiment, the low-voltage battery 8 is charged by a DC voltage output from the switching power supply device 6. However, The output from the switching power supply device 6 may be directly applied to a load.

In the embodiment, the switching power supply device 6 applied to an electric car (or a hybrid car) is described as an example. However, the switching power supply device according to the invention may be applied to a usage other than the car installation.

What is claimed is:

1. A switching power supply device comprising:
    a switching circuit converting a direct-current (DC) voltage to a pulsed voltage by a switching operation according to a Pulse Width Modulation (PWM) signal;
    a rectifying circuit rectifying the pulsed voltage;
    a smoothing circuit smoothing a voltage rectified by the rectifying circuit;
    a first voltage detecting circuit detecting an output voltage from the smoothing circuit;
    a PWM signal generating part generating the PWM signal according to the voltage detected by the first voltage detecting circuit, and providing the PWM signal to the switching circuit;
    a current transformer arranged on a front stage of the switching circuit;
    a second voltage detecting circuit detecting a secondary side voltage of the current transformer; and
    a control part calculating an output current from the smoothing circuit,
    wherein the control part calculates a duty rate of the voltage detected by the second voltage detecting circuit based on a waveform of the detected voltage, and
    wherein the control part calculates the output current based on the calculated duty rate, the voltage detected by the first voltage detecting circuit and the voltage detected by the second voltage detecting circuit.

2. The switching power supply device according to claim 1, wherein the control part calculates:
    an input voltage applied to the switching circuit based on the duty rate and the voltage detected by the first voltage detecting circuit;
    an average or a peak value of the voltage detected by the second voltage detecting circuit based on the detected voltage; and
    the output current based on the calculated input voltage and the calculated average or peak value.

3. The switching power supply device according to claim 1, wherein the control part calculates:
    an average or peak value of the voltage detected by the second voltage detecting circuit based on the detected voltage; and
    an input current through a primary side of the current transformer based on the calculated average or peak value.

4. The switching power supply device according to claim 1, wherein the control part determines whether or not a circuit failure occur, based on the current value of the output current.

* * * * *